Figure 6:
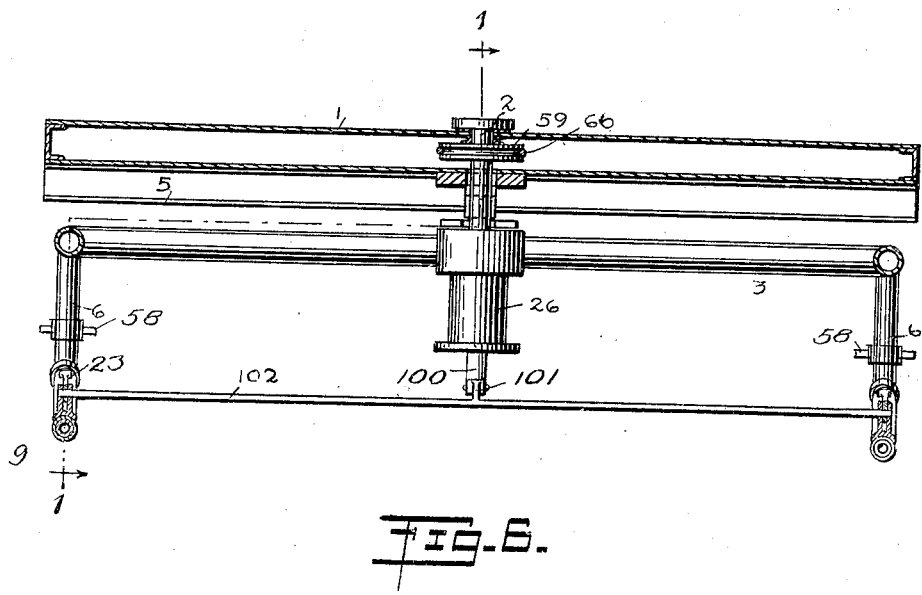

B. PÉDUCASSE.
AUTOMATIC CAR FENDER AND SAFETY BRAKE.
APPLICATION FILED DEC. 13, 1909.
1,103,826.
Patented July 14, 1914.
3 SHEETS—SHEET 1.
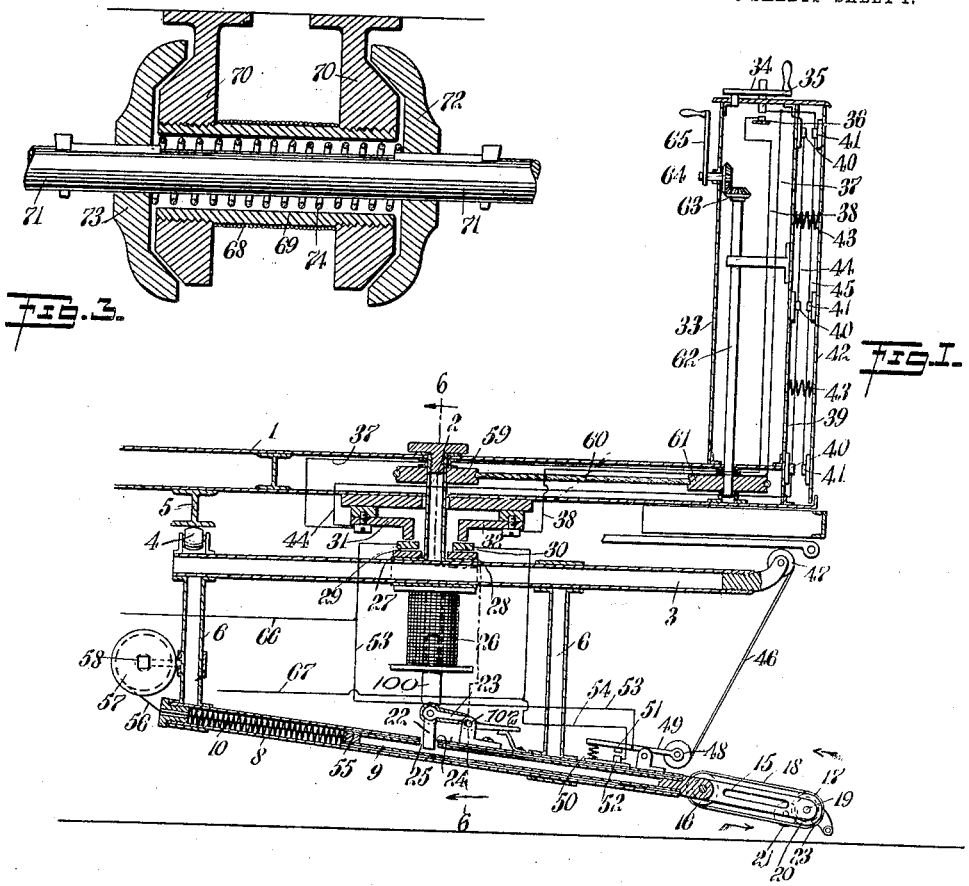
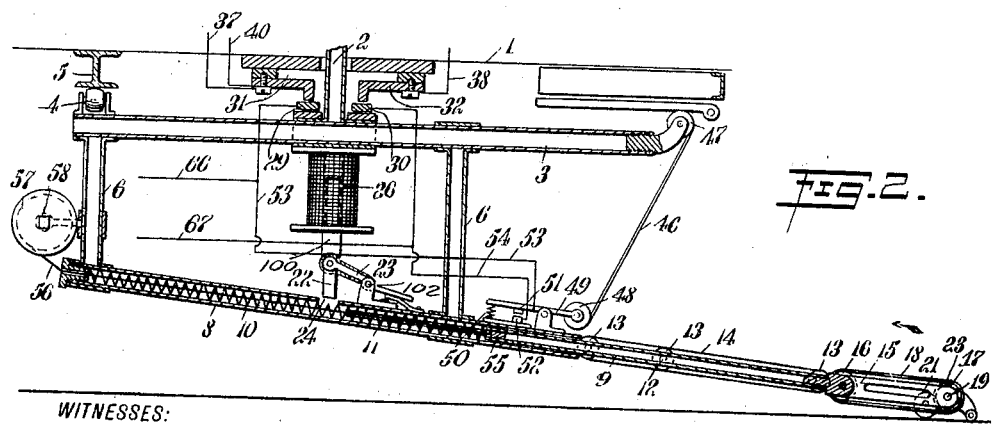
WITNESSES:
G. Robert Thomas
H. Whiting.
INVENTOR
Bernard Péducasse
BY Munn & Co.
ATTORNEYS

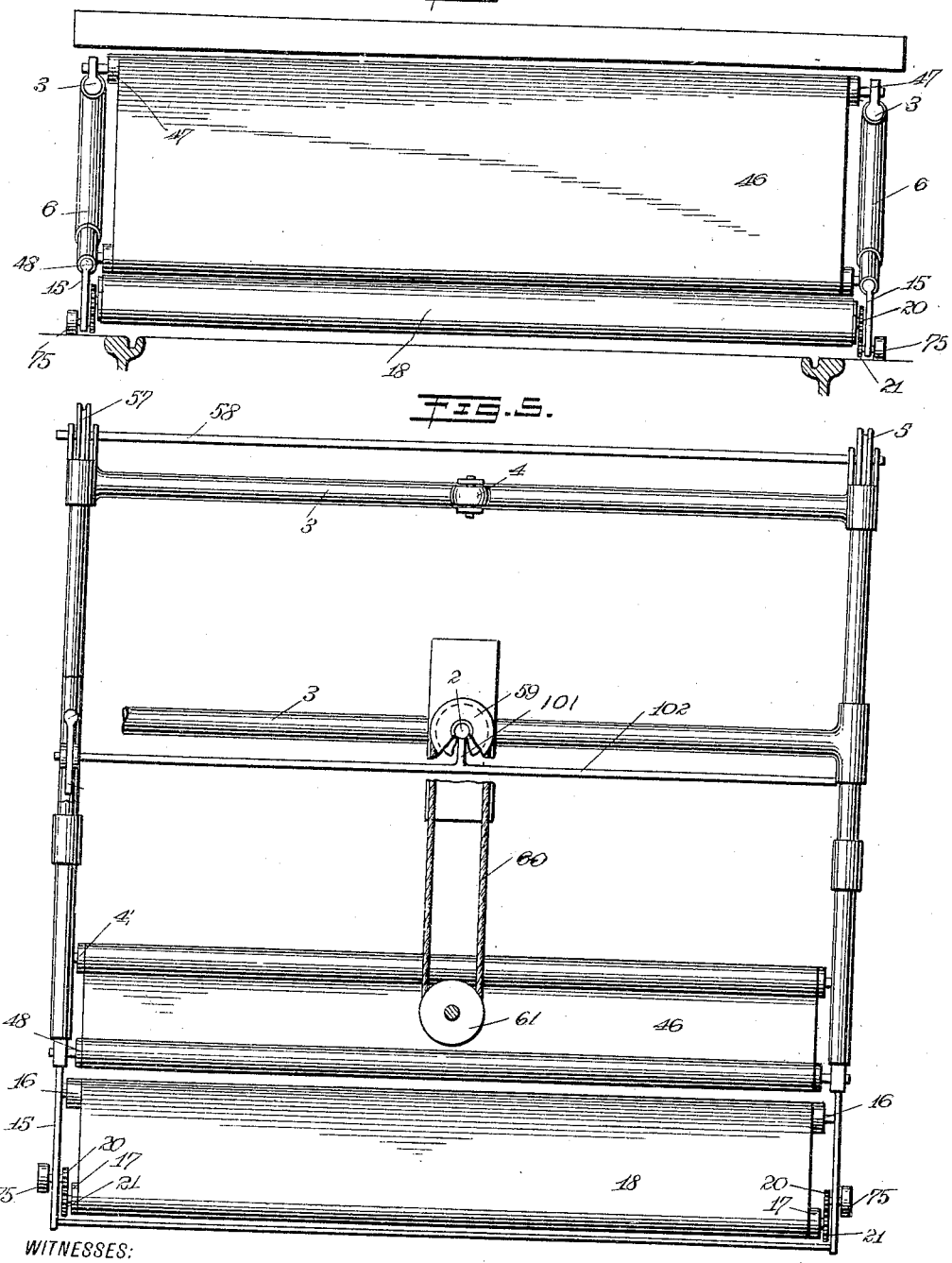

B. PÉDUCASSE.
AUTOMATIC CAR FENDER AND SAFETY BRAKE.
APPLICATION FILED DEC. 13, 1909.

1,103,826.

Patented July 14, 1914.
3 SHEETS—SHEET 3.

WITNESSES
G. Robert Thomas

INVENTOR
Bernard Peducasse
BY
ATTORNEYS

UNITED STATES PATENT OFFICE.

BERNARD PÉDUCASSE, OF LYON, FRANCE.

AUTOMATIC CAR-FENDER AND SAFETY-BRAKE.

1,103,826.  Specification of Letters Patent.  Patented July 14, 1914.

Application filed December 13, 1909. Serial No. 532,793.

*To all whom it may concern:*

Be it known that I, BERNARD PÉDUCASSE, a citizen of the Republic of France, and a resident of Lyon, France, have invented a new and Improved Automatic Car-Fender and Safety-Brake, of which the following is a full, clear, and exact description.

This invention relates to an automatic fender for electric cars or other fast-moving vehicles, parts of which are adapted to be automatically extended by the impact of the body of the person in the way, so as to readily pick up said person with the least possible injury, and at the same time, to automatically set the brakes of the car, so as to bring said car to a stop in the shortest possible lapse of time.

An object of this invention is to provide a device which will be extremely simple in construction, automatic and positive in its operation, and strong and durable.

Another object of this invention is to provide means whereby parts of a fender on a car or other vehicle may be automatically extended by the impact of a person's body, either in a high position or a low position, by suitable electrical means, and also whereby said impact will automatically set the brakes on said car by electrical means.

A further object of this invention is to provide a construction made up of a fender and coöperating parts adapted to be positioned on a vehicle, the structure being capable of rotation, so as to gather up a person lying at either side of the path of the vehicle, and which may be readily controlled by the motorman or driver of the vehicle.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a diagrammatic sectional view on the line 1—1 of Fig. 6 of the front of the car or vehicle, showing my invention attached thereto, and showing the fender in its receded or inactive position; Fig. 2 is a view similar to Fig. 1, showing the fender in its extended or active picking-up position; Fig. 3 is a fragmentary sectional detail view, showing the automatic brake on the wheel shaft; Fig. 4 is a front view in elevation; Fig. 5 is a top plan view, with parts broken away to show the underlying structure; and Fig. 6 is a vertical section on the line 6—6 of Fig. 1.

Referring more particularly to the separate parts of the device, 1 indicates one end of the body of a vehicle or car, in which is provided a vertical opening which forms a bearing for a vertical shaft 2. The shaft 2 rotatably supports a frame 3, which is provided on its rear surface with an anti-friction roller 4, which is adapted to bear on an arcuate track rail 5, secured to the under side of the body 1.

Suspended from the frame 3 by means of vertical brackets 6, there are provided tubes 8, which are preferably inclined downwardly in a forward direction. The tubes 8 are provided with tubes 9, which are adapted to telescope in the tubes 8 against the tension of springs 10. The tubes 8 are provided with slots 11 in the sides thereof, to permit rods 12 extending from the sides of the tubes 9 to pass therethrough. The rods 12 carry rollers 13, which form a suitable support for a flexible apron or belt 14.

Secured on the outer ends of the tubes 9, there is provided a frame 15, which has rollers 16 and 17 on the ends thereof, over which passes an endless belt 18. The roller 17 is secured to a shaft 19, which has also secured thereon a gear 20, which engages with a gear 21. The gears 21 are on the same stub shaft as rollers 75, which, when the tubes 9 are extended into their outer or picking-up position, rest on the ground, so as to be rotated as they pass over the ground. This drives the roller 17 in a left-hand direction, and this drives the upper surface of the endless belt 18 in the direction of the arrow, so as to pick up the person coming in contact with the forward end of the fender and deposit him on the apron 14, out of the way of the wheels of the vehicle. Normally, however, the tubes 9 are held in their collapsed position, as illustrated in Fig. 1, by means of locks 22, which are pivotally secured to spring-pressed levers 23, and which engage in alined openings 24 and 25 in the tubes 8 and 9. The locks 22 are adapted to be drawn out of engagement with the openings in the tubes 8 and 9, by means of a solenoid or other electro-magnetic device 26. The solenoid is provided with a central opening in which is adapted to reciprocate a core 100, pivotally secured to an arm 101 which is rigidly connected to a transverse bar 102. The bar 102 is pivoted loosely at its ends in the frame and has the spring pressed levers 23 rigidly secured thereto at each end, so as to rotate therewith. Thus when the solenoid draws in the core 100 it will raise the arm 101, thereby turning the bar 102 and raising the levers 23 which are rigidly secured to said bar, and as the locks 22 are pivotally secured to the ends of the levers 23, they will be simultaneously drawn up out of engagement with the openings 24 and 25 in the tubes 8 and 9. This solenoid 26 is secured to the frame 3, and therefore rotates with it, and in order to make the electric connections complete, it is provided with a pair of contact arcs 27 and 28, which are adapted to engage contact sectors 29 and 30, which engage additional contact members 31 and 32, secured to the body 1 of the car. The solenoid is adapted to be excited by one of three sources; manually by the motorman; automatically by a device actuated by a body hitting the vehicle or car at a high position; and also automatically by a body striking the car or vehicle at a low point.

Considering the manual control first, there is provided on the front of the car, adjacent the controller box 33, a handle 34, which is provided with a contact 35, that is adapted to be brought into and out of connection with a contact 36. The contacts 35 and 36 are connected by wires 37 and 38, to the contact members 31 and 32, thereby permitting the circuit through the solenoid 26 to be completed by bringing in contact the contact points 35 and 36.

In order to excite the solenoid 26 automatically by an obstruction coming in contact with the vehicle at a high point, the front 39 of the vehicle or car is provided with a plurality of contacts 40, which are opposed to contacts 41 on a movable dasher 42, which is normally held away from the front 39 by means of springs 43. When, however, an obstruction comes in contact with the movable dasher 42, the dasher is pressed rearwardly against the tension of the springs 43, thereby bringing the contacts 40 and 41 into engagement with each other, and inasmuch as these contacts are connected by wires 44 and 45 to the sectors 31 and 32, a complete circuit is made through the solenoid 26.

In case the person or other obstruction should get in the path of the vehicle below the body of the same, there is provided an apron 46, which is secured at one end on a roller 47 secured to the frame 3, and at the other end is secured to a roller 48 on a pivoted lever 49. The lever 49 is held by a spring 50, in such a position that the apron 46 is normally taut, and contact points 51 on the lever 49, and 52 on the tube 9, are held out of engagement. When, however, an obstruction comes in contact with the apron 46, this apron is distended rearwardly, thereby raising the front end of the lever 49 against the tension of the spring 50, thus bringing the contact points 51 and 52 into engagement. Inasmuch as these contact points 51 and 52 are connected by wires 53 and 54 to the contact arcs 29 and 30, the circuit through the solenoid 26 is completed.

Of course, it is understood that each of the circuits is connected to a suitable source of electricity, so that when the contact is made and the circuit completed, the solenoid 26 will be excited so as to draw the core 100 up into the solenoid, thereby drawing the locks 22 out of engagement with the alined openings 24 and 25 in the tubes 8 and 9, thus permitting the springs 10 to expand and force out the forward end of the fender into a receptive position.

In order to draw the tubes 9 and the forward portion of the fender connected thereto into collapsed or receded position, the ends of the tubes 9 are provided with blocks 55, to which are secured cables 56, which are adapted to be wound on reels 57 secured to the rear bracket 6. The reels 57 are secured on a shaft 58, which has a squared end, whereby the reel may be wound up by a suitable crank (not shown), so as to draw the tubes 9 inwardly against the tension of the springs 10 until the locks 22 are forced by their springs into engagement with the openings 24 and 25 in the tubes 8 and 9.

In order to rotate or swing the fender as a whole from one side to the other of the car or vehicle, so as to pick up an inert body lying in the path of the vehicle, the shaft 2 is provided with a pulley 59, which is connected by means of an endless flexible rope 60 to a similar pulley 61 on a shaft 62. The shaft 62 is provided at its upper end with a bevel gear 63, which engages with a corresponding bevel gear 64, secured to a hand crank 65. The latter is placed convenient to the driver or motorman of the vehicle or car, so that by rotating the same, the front end of the fender can be swung to one side or the other of the vehicle, where it will be best adapted to come into proper engagement with the obstruction in the path of the vehicle.

In order that when any one of the circuit-making arrangements excites the solenoid 26 to remove the lock 22 so as to extend the forward part of the fender, the car or vehicle may be stopped automatically by applying a brake, the solenoid 26 is connected by wires 66 and 67 to a coil 68 (see Fig. 3), in such a manner that when the solenoid 26 is excited, the coil 68 will be excited. The coil 68 is wound on a spool 69, which has iron terminals 70, secured in any well known manner to the body of the car. The spool 69 is concentrically arranged with one of the wheel shafts 71 of the car or vehicle, preferably the motor shaft. Splined onto the shaft 71, there are provided friction shoes 72 and 73, normally spread apart, and held out of engagement with the corresponding terminals 70 by means of a coil spring 74, arranged on the shaft 71 within the spool 69. Thus, when the solenoid 26 is excited by any one of the contact-making arrangements, the coil 68 will also be excited, and the terminals 70 magnetized, so as to draw the shoes 72 and 73 against the tension of the spring 74 into engagement with the stationary heads 70, and thus apply the brake shoes to the shaft 71. An independent electro-manual control for this brake may be used, if desired, independently of the fender actuating mechanism.

The operation of the device will be readily understood when taken in connection with the above description.

When the motorman or driver of the car or vehicle observes an obstruction or person in the pathway of the vehicle, he may extend the forward portion of the fender to the position indicated in Fig. 2, by operating the hand lever 34, which simultaneously makes a circuit through the solenoid 26 and the coil 68, thereby at the same time applying the brake, so as to bring the car to a stop in the shortest space of time. If the vehicle is traveling at a high rate of speed, and the motorman is neglectful or unobservant, and an obstacle lies in the path of the vehicle, there are two ways in which the forward portion of the fender may be extended and the brake set. These are, by hitting the movable dasher 42, and thus making the circuit complete through the solenoid 26 to the coil 68, or by hitting the apron 46 and again making the circuit complete. In whatever manner the end of the fender is extended, the roller 21 will come in contact with the ground, thereby driving the endless belt 18 in the direction indicated by the arrow, so that it will tend to drag a person or obstacle coming in contact therewith onto the apron or belt 14 and prevent the wheels from coming in contact therewith. Should the motorman observe an obstacle in the path of the vehicle to one side of the direct line of travel and yet in danger of being run over by the wheels, he may swing the fender, as a whole, on the shaft 2 by rotating the crank 65. When it is desired to collapse the fender and telescope the tubes 9 into the tubes 8 after the same has been extended, a suitable hand crank is applied to the shaft 58, and the reels 57 rotated to wind up the cable 56 and thus draw the tubes 9 inwardly against the tension of the springs 10, to a position in which the locks 22 will engage in the alined openings 24 and 25 in the tubes 8 and 9, whereby the mechanism will be set ready for any possible subsequent accident.

Having thus described my invention, I claim as new and desire to secure by Letters Patent:—

1. In a device of the class described, and in combination with a suitable vehicle, a fender comprising a plurality of parts in telescoping relation, the said parts having openings adapted to register, locking means adapted to engage said openings to retain one of said parts in retracted position, means for projecting the said part relatively to the other when the locking means is released, a brake on the vehicle, and a plurality of independently operable means for simultaneously releasing the said locking means and actuating the said brake, whereby the speed of the car is lessened when the said part is brought to projected position.

2. In a device of the class described, the combination with a suitable vehicle of a fender rotatably mounted thereon, the fender comprising parts telescopically related, means for holding one of the parts in a retracted position, other means for projecting the said part, a brake on the vehicle, and a plurality of independently operable means for moving the said holding means in order to permit the said part of the fender to be projected and for actuating the brake in any position the said part may occupy.

3. In a device of the class described, in combination with a suitable vehicle, of a rotatable fender, the fender comprising two parts in movable relation, means for maintaining the parts in such relation, the said means comprising locks movably mounted in position, parts of the fender being provided with registering openings into which the said locks extend, a solenoid associated with the locks, a plurality of independently operable means for closing the circuit through the solenoid, and means for projecting one of the said parts of the fender relatively to the other when the locks are actuated by the solenoid.

4. In a device of the class described, in combination with a suitable vehicle, a fender rotatably mounted thereon, the fender comprising parts in movable relation, means for holding the parts in one relation, the said means including locks, a solenoid carried by the fender for actuating the locks, means between the fender and the vehicle for maintaining electrical connection with the solenoid in any position of the fender, means for moving one of the said parts relatively to the other, and a plurality of independently operable means for closing a circuit through the said solenoid.

5. In a device of the class described, in combination with a suitable vehicle, a fender rotatably mounted on the vehicle, the fender comprising a plurality of parts in extensible relation, means for holding the said parts in non-extended position, the said means comprising an electro-magnetic device carried by the fender, means for extending the said parts relatively to each other, and coöperating means on the vehicle and fender whereby the circuit through the said electromagnetic device may be closed in any position of the fender.

6. In a device of the class described, the combination with a suitable vehicle, of a fender rotatably mounted on the vehicle, the fender comprising a plurality of parts in extensible relation, means for holding the parts in non-extended position, means for extending the parts, an electro-magnetic device for releasing the holding means and carried by the fender, an electro-magnetic brake on the vehicle, and coöperating parts on the vehicle and fender whereby the said electro-magnetic device is always in circuit, there being a plurality of independently operable means for closing the said circuit and actuating the said device and also the brake in any position of the fender.

7. In a device of the class described and in combination with a suitable vehicle, a fender rotatably mounted on the vehicle, the fender comprising a plurality of parts in telescopic relation, means for holding the parts in such relation, the said means comprising locks, means for projecting one of the said parts relatively to the other and comprising springs, an electro-magnetic device mounted on the fender, the core of the said device being in operative relation with the locks, coöperating parts on the fender and the vehicle whereby electrical connection with the said device is maintained, and a plurality of independently operable means for closing the electrical connection to the said device in any position of the fender.

8. In a device of the class described and in combination with a suitable vehicle, a fender rotatably mounted on the vehicle, the fender comprising parts telescoping one within the other, locks for holding one of the parts in retracted position, springs for projecting the said part when the locks are released, a solenoid carried by the fender, means adapted to be actuated by the solenoid and in engagement with the locks, contacting pieces carried by the vehicle and fender whereby electrical connection with the solenoid is maintained in any position of the fender, and means for closing the circuit in which the solenoid is placed whereby the locks may be released in any position of the fender.

9. In a device of the class described and in combination with a suitable vehicle, a fender rotatably mounted on the vehicle, means for rotating the fender, the fender including a plurality of parts in extensible relation, means for holding one of the parts in unextended position, means for extending the said part, a solenoid carried by the fender, the solenoid being adapted to release the said holding means, coöperating parts between the vehicle and the fender whereby electrical connection with the solenoid may be maintained in any position of the fender, a brake carried by the vehicle, means for actuating the said brake, the said means being in circuit with the solenoid, and means for closing the said circuit whereby the said part of the fender may be extended and the brakes may be set in any position of the fender.

10. In a device of the class described and in combination with a suitable vehicle, a fender comprising a plurality of parts in extensible parts, means for maintaining one of the said relation in non-extended position, means for extending the said part relatively to the other, the said fender being rotatably mounted on the vehicle, there being means for rotating the fender and the solenoid, the core of which is operatively connected to the said holding means, together with a plurality of independently operable means for closing the circuit through the said solenoid whereby the holding means may be released and the said part of the fender brought to extended position, there being contacting portions between the fender and the vehicle whereby the device may be actuated in any position of the fender.

11. In a device of the class described, the combination with a suitable vehicle of a fender rotatably mounted on the vehicle, the fender comprising parts, one of which is extensible relative to the other part, registering openings in each of the said parts, a lock adapted to enter the said openings whereby the extensible part is held in unextended position, a solenoid carried by the fender, the core of the solenoid being in operative relation with the said locks, springs bearing on the extensible part for extending the said part when the said locks are released the said springs being carried by the other part of the fender, contacting portions carried by the fender and the vehicle whereby electrical connection with the solenoid is maintained at any position of the fender, a movable dashboard on the vehicle, contacting devices adapted to be brought into engagement with each other by movement of the dashboard in order to close the circuit through the said solenoid, and means adjacent the dashboard for rotating the said fender.

12. In a device of the class described and in combination with a suitable vehicle a fender comprising a plurality of parts in movable relation, each of the said parts being provided with registering openings, a lock adapted to enter each of the said openings whereby one of the parts is held in unextended position, a spring for maintaining the locks in such position, a spring bearing against the said part of the fender and adapted to extend the same when the locking means is released, the said spring being contained in the other part of the fender, an electro-magnetic device carried by the fender, the core of the said device being operatively connected with the said locks, a dashboard movably mounted adjacent the end of the car, contacts mounted on the dashboard, other contacts carried by the vehicle, means for rotating the fender, the said solenoid being operable to release the said locking means and to permit the parts of the fender to be extended in any position the said fender may occupy.

13. In a device of the class described, the combination with a suitable vehicle of a fender comprising telescoping parts rotatably mounted on the vehicle, means for maintaining one of the said parts in retracted position, means for projecting the said part into extended position, means for rotating the said fender and a plurality of independently operable means for projecting the said part relatively to the other in any position the fender may occupy, and other means for releasing the said retaining means, there being other means for bringing the parts of the fender to telescoped position.

In testimony whereof I have signed my name to this specification in the presence of two subscribing witnesses.

BERNARD PÉDUCASSE.

Witnesses:
THOMAS N. BROWNE,
MARIN VACHONS.

Copies of this patent may be obtained for five cents each, by addressing the "Commissioner of Patents, Washington, D. C."